July 21, 1970     J. D. MAAHS     3,521,030
MOBILE OVEN UNIT
Filed Feb. 25, 1966
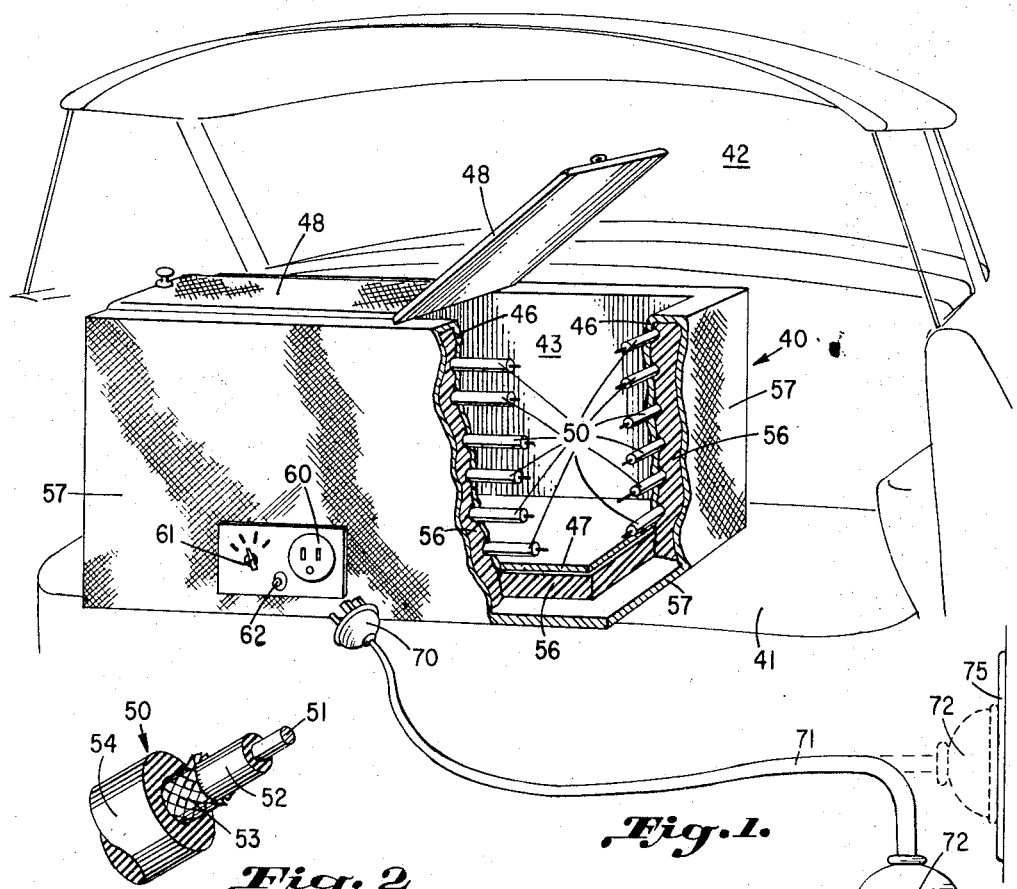
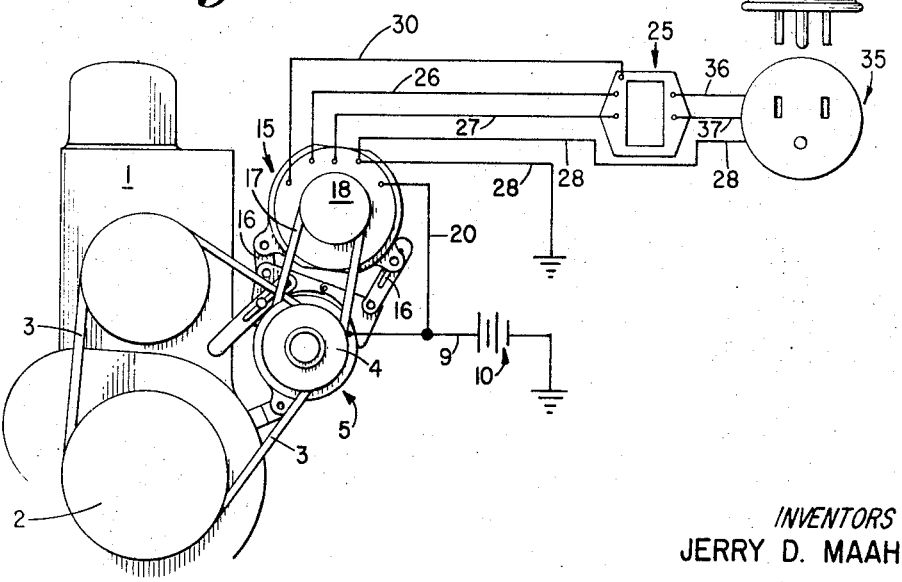
INVENTORS
JERRY D. MAAHS
BY Richard C. Steinmetz Jr.

United States Patent Office 3,521,030
Patented July 21, 1970

3,521,030
MOBILE OVEN UNIT
Jerry D. Maahs, 6956 N. Rockledge Ave.,
Milwaukee, Wis. 53209
Filed Feb. 25, 1966, Ser. No. 530,165
Int. Cl. B01l 1/02
U.S. Cl. 219—202                        5 Claims

ABSTRACT OF THE DISCLOSURE

A portable perishable oven for a mobile warming unit having walls forming a perishable compartment surrounded by electrical heating cable. The cable comprises a resistance wire surrounded by insulation and metallic shielding. The warming unit comprises an electrical generating unit which is mechanically and electrically connected to the power source of a transporting vehicle.

---

This invention pertains to a method and apparatus to establish and maintain a predetermined temperature in a portable container for the desired time period. More particularly, this invention is directed to a mobile warming unit for perishables such as food which can be heated by electrical energy supplied from the unit and derived from the transporting vehicle's motivating power source as well as by electrical energy supplied independent of the warming unit.

It has been a problem for those in the domestic food delivery business to efficiently and safely maintain and control the heat supplied to food being delivered in a vehicle during delivery and thereafter. The most used answer during the last decade, unacceptable as it may be, has been the use of an open flame between the oven's outer shell and the inner food container; the flame supplied by a fuel such as gas. Not only is this flame unsafe—for example should the transporting vehicle be involved in an accident, the flame can easily spread—but the flame is also inefficient due to the need for a continuous flame burning expensive fuel. Moreover, an open flame requires constant surveillance by the vehicle operator or another.

These and other problems have been solved by the present invention through the use of necessary electrical power generated by generating means supplemental to that used by motivating power source of the transporting vehicle. This generated electrical power is then regulated and directed to heating cable located adjacent to the food container so as to supply heat to the food compartment within.

It is an object, then, of this invention to provide an efficient and safe method and apparatus to establish and maintain a temperature in a mobile oven for perishables during and after transportation thereof.

It is a further object of this invention to provide a mobile unit utilizing the motivating power source of the transporting vehicle to generate sufficient supplemental electrical power so as to heat a mobile oven for perishables.

It is a further object of this invention to provide a mobile perishable warming unit which supplies electrical energy compatible with available electrical energy from sources independent of said unit so that either the unit or said independent source can supply necessary electrical energy for purposes of heating.

It is a still further object of this invention to provide a mobile perishable warming unit with an oven which utilizes a simple yet highly successful construction incorporating wrapped heating cable.

These and other objects will become apparent from the following description of a particular embodiment of the invention; which embodiment is described for exemplary purposes only. The reader is referred to the appended claims which set forth the breadth and scope of the invention.

FIG. 1 is a schematic showing of the mobile unit including the oven, the connecting conductor and plugs plus a representation of the electrical energy source independent from the mobile unit.

FIG. 2 is a cutaway view of an illustrative piece of heating cable as wrapped around the oven.

A representation of a motivating power source for a transporting vehicle is shown at 1 in the form of an automobile engine. Pulley 2 is connected to the drive shaft (not shown) of engine 1 so as to transfer rotary motion therefrom through belt 3 in normal fashion. Here, pulley 4 of the usual auto generator 5 is rotated through contact with belt 3.

The electrical circuitry for the invention is shown schematically and includes only those portions of a standard auto electrical system which are directly involved. Thus, the generator 5 is connected to battery 10 through conductor 9 and battery 10 is grounded.

Since the oven of the mobile unit, which is to be heated and will be described below, requires power not available in the automobile or other potential transporting vehicles, an additional electrical generating unit is a part of the mobile unit—here shown as alternator 15 which is mechanically attached to generator 5 by the brackets 16. The necessary rotary motion for the alternator 15 can be supplied through belt 17 connecting pulley 4 of generator 5 to pulley 18 of the alternator 15.

Part of the electrical energy output of generator 5 is diverted to the alternator 15 by way of conductor 20 so as to supply the necessary field current. In turn, the electrical energy output of alternator 15 is conducted to a voltage regulator 25 by way of conductors 26 and 27. Grounding is supplied through conductor 28.

A maximum voltage, necessary for proper heat without damage to the unit, is established in the voltage regulator 25 with feedback to the alternator 15 via conduit 30 illustrating a way by which actual output of the alternator 15 can be controlled. This regulated electrical energy is connected to socket 35 by way of conductors 36 and 37.

The oven 40 of the mobile unit is shown in a representative transporting vehicle—specifically, a seat 41 of an automobile 42. Within the oven 40 is the food compartment 43 made from inside shell walls 46, wall-floor 47 and a pivoted cover 48. It should be noted that the particular location of the outside access to compartment 43 is not to be limited by that access shown in FIG. 1 and closed by cover 48.

Wrapped around the walls 46 (and under the floor 47—if desired) is heating cable 50 with the cable 50 located so as to provide the desired uniform heat in compartment 43. As shown, the cable 50 is a single piece looped from top to bottom of the walls 46 at regular intervals. Particular significance is placed upon the means used to supply the heat to the oven 40, viz the use of heating cable such as Chromalox Electric Heating Cable manufactured by Edwin L. Wiegand Company. FIG. 2 shows the details of such cable with its resistance wire 51, a silicone rubber sheath 52 surrounding, protecting and insulating the wire 51, a metallic braid for strength and grounding purposes and finally an outer silicone rubber jacket 54. The advantages of such cable are many but include: a long, maintenance-free life (which is critical due to the relatively inaccessible location of the cable); the cables' unusual mechanical strength which permits the wrapping technique and the consequential decided advantage in the uniformly heated compartment 43; certainty as to the resulting heat conditions and distribution due to the calculable relationship between heat output and the length of cable used; and the fact that the cable supplies heat in proportion to the amount of electric power supplied rather than requiring a minimum amount of power before the first B.t.u. of heat will be available.

The construction of the oven 40 is completed by insulation 56 which can be fiber glass sheets placed around the walls 46, wall-floor 47 and cable 50 so as to keep the heat from the cable 50 within the compartment 43. The top 48 will also include insulation. Outer shell 57 encloses the oven and provides necessary protection.

The heating cables 50 in oven 40 are connected to socket 60 through a thermostat switch 61 which senses the temperature in compartment 43. Thus, a desired temperature can be established by proper selection of thermostat 61. This means energy is supplied to the oven 40 only when needed so as to provide a desired temperature—which are two advantages not available in the open flame oven described above.

The third wire, ground connection in socket 60 is preferably connected to the braid 53 of the cable 50. An indicator light 62 is a safety feature connected into the thermostat switch 61 circuit so as to indicate when the switch is closed, i.e. when the cable 50 is conducting and supplying heat.

Plug 70 and conductors 71 connect the heating cables 50 of oven 40, through socket 60, to the necessary electrical energy source of the mobile unit available at socket 35 through plug 72.

In actual practice, it is learned that at least about 1000 watts is necessary to properly heat the compartment 43. This requirement has been satisfactorily met by using in the mobile unit a 110 volt alternator manufactured by Gener AC Corp. of Genesee Depot, Wis.—Model No. 5012. The voltage is extremely important to this invention in order that the mobile unit will be compatible with other commonly available electrical energy sources—particularly those found in the usual residence. Thus, oven 40 can be heated by electrical energy from a source independent of the mobile unit; for example, by connecting plug 72 to socket 75 which represents this independent energy source.

In use, the compartment 43 is filled with perishables such as food to be transported and the oven 40 is placed in the transporting vehicle 42. The socket 60 is connected to the socket 35 through connection means such as plugs 70 and 72 and conductors 71 to thereby establish the mobile unit of this invention. During transportation to a particular destination, the compartment and the food therein is maintained at a desired temperature by means of heating cables 50 conducting electrical energy supplied by alternator 15. Upon arrival at this destination, the portable oven 40 can be removed from the vehicle—after separating plug 72 from socket 35—and moved to a more permanent location. Plug 72 is then connected to the electrical energy source 75 at the destination so the food in compartment 43 will continue at the desired temperature without handling thereof—and without any significant change in food temperature during this transfer of oven 40 from the vehicle 42 because of the insulation 56 which retains the necessary heat during the transfer period.

I claim:
1. A portable perishable oven operable on a regulated voltage output in a motor vehicle or a voltage source independent thereof, said oven having,
   (a) wall means forming a perishable compartment,
   (b) heating cable means wrapped thereabout,
   (c) insulation encasing said wall means and said heating cable means so as to maintain heat in said compartment,
   (d) outer shell means to encase said oven and forming an oven adapted in size for transportion in and removal from vehicles,
   (e) an opening in at least one wall means with removable cover means thereover, and
   (f) electrical connector and conductor means for electrically connecting said heating cable means to a desired electrical potential source,
the improvement comprising said heating cable means being a single electrical heating cable means surrounding said wall means in wrapped fashion so as to supply heat to said compartment and operable on said regulated voltage output or said independent voltage each of which is at least about 100 volts.

2. The portable oven of claim 1 wherein said cable means comprises resistance wire with insulating and metallic shielding surrounding said resistance wire.

3. The portable oven of claim 2 including grounding means connected to said metallic shielding of said cable means.

4. The portable oven of claim 1 wherein said heating cable means is operable at at least 1000 watts.

5. The portable oven of claim 1 including thermostat switch means to vary the electrical current to said cable from said electrical potential source for heating in response to the temperature of said compartment.

References Cited

UNITED STATES PATENTS

| | | | |
|---|---|---|---|
| 1,663,744 | 3/1928 | Ziola | 219—406 X |
| 3,280,301 | 10/1966 | Anderson et al. | 219—202 X |
| 1,554,365 | 9/1925 | Parker et al. | 219—386 X |
| 1,683,889 | 9/1928 | Hayne | 219—386 X |
| 2,087,776 | 7/1937 | Morley | 219—202 X |
| 2,158,733 | 5/1939 | Sola | 219—202 X |
| 2,205,884 | 6/1940 | Greenman | 219—386 X |
| 2,529,914 | 11/1950 | Challenner | 219—528 X |
| 2,944,134 | 7/1960 | Kenyon | 219—386 X |
| 3,051,582 | 8/1962 | Muckler et al. | 219—386 X |
| 3,209,128 | 9/1965 | Chapman | 219—544 X |
| 3,364,335 | 1/1968 | Palatini et al. | 219—544 X |

JOSEPH V. TRUHE, Primary Examiner

C. L. ALBRITTON, Assistant Examiner

U.S. Cl. X.R.

219—386, 407